United States Patent
Batistic et al.

(10) Patent No.: US 6,974,195 B2
(45) Date of Patent: Dec. 13, 2005

(54) METHOD FOR INCREASING THE MANEUVERABILITY OR DRIVING STABILITY OF A VEHICLE DURING CORNERING

(75) Inventors: Ivica Batistic, Deutschland (DE); Robert Schmidt, Rennerod (DE); Wolfgang Kling, Frankfurt (DE); Andreas Kohl, Mainz (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 10/181,136

(22) PCT Filed: Jan. 11, 2001

(86) PCT No.: PCT/EP01/00265

§ 371 (c)(1),
(2), (4) Date: Jul. 12, 2002

(87) PCT Pub. No.: WO01/51327

PCT Pub. Date: Jul. 19, 2001

(65) Prior Publication Data

US 2003/0011241 A1 Jan. 16, 2003

(30) Foreign Application Priority Data

Jan. 13, 2000 (DE) .......................................... 100 01 019
Feb. 1, 2000 (DE) .......................................... 100 04 243

(51) Int. Cl.$^7$ ................................................ B60T 8/60
(52) U.S. Cl. ...................................... 303/146; 303/140
(58) Field of Search ................................ 303/139, 140, 303/146, 147, 148

(56) References Cited

U.S. PATENT DOCUMENTS 4,349,876 A * 9/1982 Lindemann ................. 303/149
5,645,326 A * 7/1997 Sano .......................... 303/146
5,702,165 A * 12/1997 Koibuchi .................... 303/146
5,717,591 A * 2/1998 Okada et al. ............... 303/139
5,722,743 A * 3/1998 Sano .......................... 303/146

FOREIGN PATENT DOCUMENTS

| DE | 43 40 921 | 6/1995 |
|---|---|---|
| DE | 195 22 632 | 1/1997 |
| DE | 196 28 981 | 1/1998 |
| DE | 196 51 460 | 6/1998 |
| DE | 198 16 432 | 10/1998 |
| DE | 197 33 674 | 2/1999 |
| DE | 198 17 285 | 4/1999 |
| DE | 197 52 061 | 5/1999 |
| DE | 198 00 975 | 7/1999 |
| DE | 198 32 484 | 8/1999 |
| EP | 0 872 393 | 10/1998 |
| WO | 99 30942 | 6/1999 |

* cited by examiner

Primary Examiner—Robert A. Siconolfi
(74) Attorney, Agent, or Firm—Honigman Miller Schwartz and Cohn LLP

(57) ABSTRACT

A method for increasing the maneuverability and driving stability of an automotive vehicle during cornering, the rotational behavior or the wheel slip of the individual vehicle wheels is monitored, and the distribution of the brake force to the curve-outward wheels compared to the brake force conducted to the curve-inward wheels is varied in dependence on the wheel rotational behavior and on the slip of the wheels. When cornering is detected, a total deceleration of the vehicle that corresponds to the driver's request is determined, and a vehicle deceleration that corresponds to the driver's request is achieved by increasing the brake force at the curve-outward wheels and decreasing or maintaining the brake force at the curve-inward wheels.

9 Claims, 4 Drawing Sheets

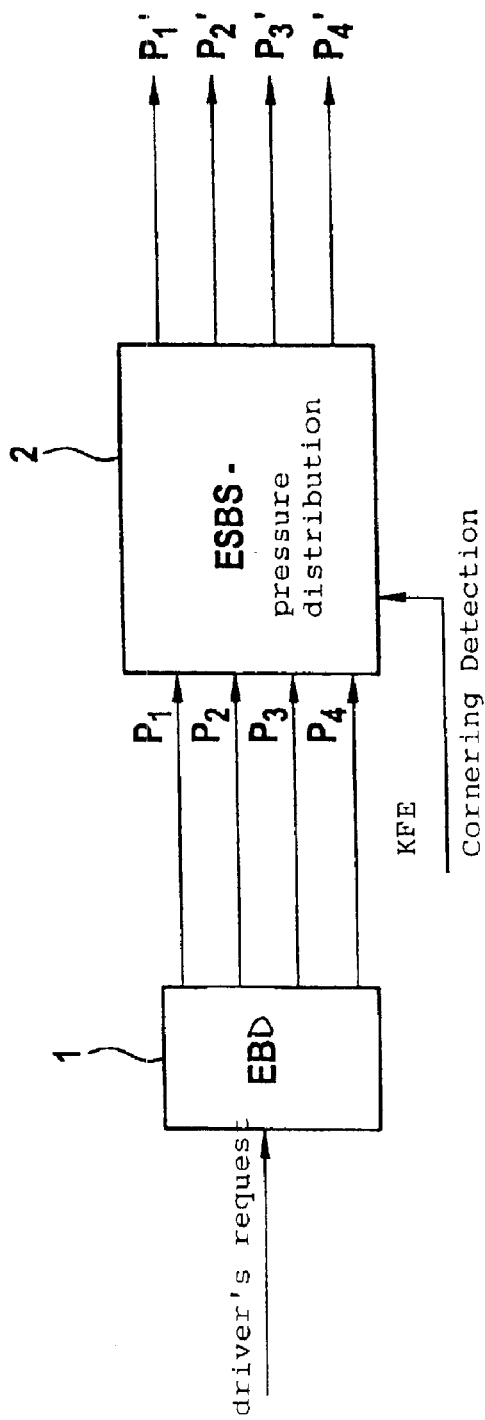
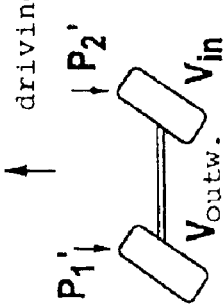
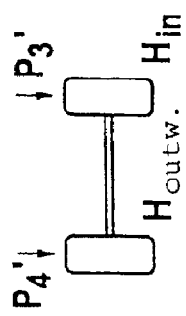
Fig. 1

METHOD FOR INCREASING THE MANEUVERABILITY OR DRIVING STABILITY OF A VEHICLE DURING CORNERING

TECHNICAL FIELD

The present invention generally relates to a system for enhancing vehicle maneuverability and more particularly relates to a method for increasing the maneuverability or driving stability of an automotive vehicle equipped with a controlled brake system.

BACKGROUND OF THE INVENTION

DE 195 22 632 A1 discloses a method of this general type wherein a switch-over from a normal control mode to a cornering control mode is effected when cornering is detected in order to improve the steerability of the vehicle and its driving stability. In this special mode, compared to the normal control mode, the mean pressure level of the curve-inward front wheel is decreased by a predetermined value and the mean pressure level of the curve-outward front wheel is raised by a predetermined value. This method concerns improving the control behavior of an anti-lock control system (ABS) during cornering, for what reason the term ABSplus (improved ABS) or ESBS (Enhanced Stability Brake System) is used. Brake pressure increase (at the curve-outward front wheel) in excess of the pilot pressure produced by brake pedal application is neither arranged for, nor possible.

Further, it is known from DE 196 48 909 A1 with a view to improving the control behavior of an anti-lock brake system which is apt for active braking intervention to initiate a special control if, during cornering without brake application, a deceleration of the vehicle is detected and if, simultaneously, a critical wheel slip condition indicative of inward steering of the vehicle (oversteering) is satisfied, the said special control effecting the introduction of brake pressure into the wheel brake of the curve-outward front wheel. This special control which prevents oversteering of the vehicle is in function only when the brake is not applied.

BRIEF SUMMARY OF THE INVENTION

An object of the present invention is to improve upon a method or a brake system of the type mentioned hereinabove to such effect that when travelling in a curve, when changing lanes, or in similar maneuvers, a good steerability and high driving stability as well as a short stopping distance or a precise brake effect is achieved which latter corresponds to the driver's request that is expressed by the extent of brake pedal application. The objective is to convert the driver's request into a corresponding vehicle deceleration both in emergency brake situations and in the event of a 'gentle' pedal application.

This object is achieved by a method of the type referred to hereinabove which includes that during cornering detection, a total deceleration of the vehicle which corresponds to the driver's request is determined, and that the vehicle deceleration which corresponds to the pedal force or the driver's request is achieved by increasing the brake force at the curve-outward front wheel and/or rear wheel in excess of the brake force that corresponds to the driver's request and by decreasing the brake force or maintaining the brake force constant at the curve-inward wheel(s).

According to the present invention, the brake pressure and, hence, the brake force is increased at the curve-outward front wheel, yet decreased or maintained constant at the curve-inward front wheel for compensating an oversteering driving behavior which may for example occur during cornering, in the event of a sudden change of lanes, etc. The asymmetric distribution of the brake forces on the front axle is adapted to driving conditions by the control system.

In conventional systems with an improved steerability by variation of the pressure level at the curve-outward and curve-inward wheel, the (increased) brake pressure at the curve-outward wheel is not able or allowed (the brake system is so designed) to exceed the pilot pressure predetermined by the pedal application or the brake force predetermined by the pedal force. Consequently, the total deceleration of the vehicle compared to straight travel or a cornering maneuver with like brake pressures at the curve-outward and curve-inward wheels automatically becomes lower. This is confusing at least for the driver and demands an adaptation to the special situation. The method of the present invention, however, permits achieving the total deceleration desired by the driver even during cornering, in the event of a sudden change of lanes, etc.

It is favorable to build up pressure at the curve-outward wheel beyond the driver's specification as a consequence of the method of the present invention also with low pressure specifications set by the driver, where it would be impossible to generate the necessary stabilizing moment by a pressure buildup (at the curve-inward wheel) alone.

In advantageous alternative embodiments of the method of the present invention, the increase of the brake force at the curve-outward wheels and the decrease at the curve-inward wheels may be effected simultaneously or within a predetermined period in steps, for example by pressure variation pulses or pressure variation pulse trains. On the other hand, it is also possible and even favorable in many cases to perform the increase at the curve-outward wheels and the corresponding decrease at the curve-inward wheels in a deferred manner. In this arrangement, the increase of the brake force [e.g.] for example by a predetermined period in the magnitude of 50 ms to 500 ms should be carried out subsequent to the brake force decrease at the curve-inward wheel or the curve-inward wheels.

A brake system which is especially appropriate for implementing the method of the present invention is configured as a so-called brake-by-wire system (BBW), e.g. as an electrohydraulic brake system (EHB) or electromechanic brake system (EMB). In brake systems of this type, the pedal application or the driver's request expressed by pedal application is principally sensed and transmitted in the form of an electric signal to the brake force generating means. It is not difficult in such systems to achieve a brake force increase at the curve-outward wheel beyond the driver's request.

Further advantages, features, and possible applications of the present invention can be taken from the following description of details and embodiments by way of the attached drawings. [In the drawings,]

BRIEF DESCRIPTION OF THE DRAWINGS

FIG. 1 is a schematically simplified view of a brake system for implementing the method of the present invention.

DETAILED DESCRIPTION OF THE PREFERRED EMBODIMENTS

According to the principle of the present invention illustrated by way of FIG. 1, the 'driver's request' which is expressed by application of the brake pedal is initially realized by a block 1 referred to as EBD (Electronic Brake Force Distribution) is realized in brake force components or pressure components $P_1$ to $P_4$ for the individual vehicle wheels 1 to 4. In a subsequent block or a processing step 2 which is called by experts 'ESBS pressure distribution' (brake systems of this type are referred to as 'ABSplus' systems or 'Enhanced Stability Brake Systems') in FIG. 1, the pressure or brake force components $P_1$ to $P_4$ associated with the individual wheels during cornering detection (KFE) are modified according to the specifications of the method of the present invention so that pressure or brake force components $P_{1'}$ to $P_{4'}$ are available at the output of step 2.

Cornering detection may be realized in very different fashions. E.g. cornering detection by monitoring the slip variations of the individual wheels is known in the art. At least seemingly, there is a different slip at the curve-outward wheels compared to the curve-inward vehicle wheels.

An oversteering vehicle is illustrated symbolically in the bottom part of FIG. 1 to make clear that in the event of implementation of the method of this invention, the pressure (or the brake force) $P_1$ calculated in step 1 is increased by a defined amount $\Delta P_1$ at the curve-outward front wheel $V_{outw.}$, while the pressure $P_2$ at the curve-inward front wheel $V_{inw.}$ is lowered by a differential pressure $\Delta P_2$. Consequently, the brake pressure $P_{1'}$ is higher than the brake pressure $P_1$ which corresponds to the driver's request. This is of decisive importance to the present invention.

Figure 2:
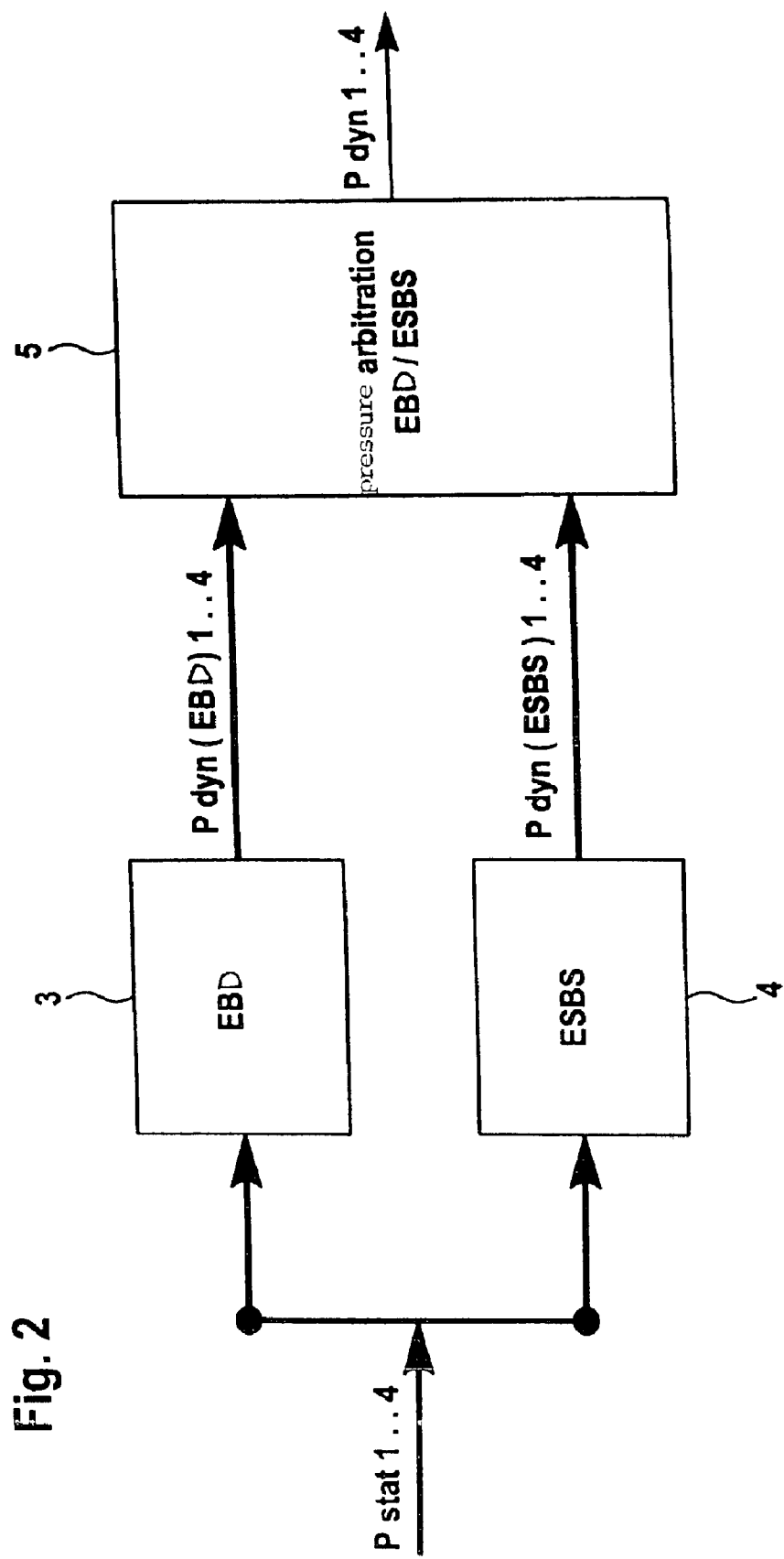
FIG. 2 is a schematically simplified view of components of a brake system of the present invention.

As another embodiment of the present invention, FIG. 2 schematically shows a brake system wherein the pedal force or the pressure '$P_{stat.}1 \ldots 4$' which expresses the 'driver's request' and applies in the static condition of the vehicle and during straight travel, is sent to a brake force distributor 3 (EBD), on the one hand, and, on the other hand, to a step 4 referred to as 'ESBS' in which the special conditions during cornering maneuvers are taken into account. The dynamic components '$P_{dyn}(EBD)1 \ldots 4$' calculated by the electronic brake force distribution EBD 3 and the dynamic components $P_{dyn}(ESBS)1 \ldots 4$ responsive to cornering are evaluated in a distribution step 5, referred to as 'pressure arbitration', with a view to calculating the components '$P_{dyn}1 \ldots 4$' sent to the individual vehicle wheels.

Figure 3:
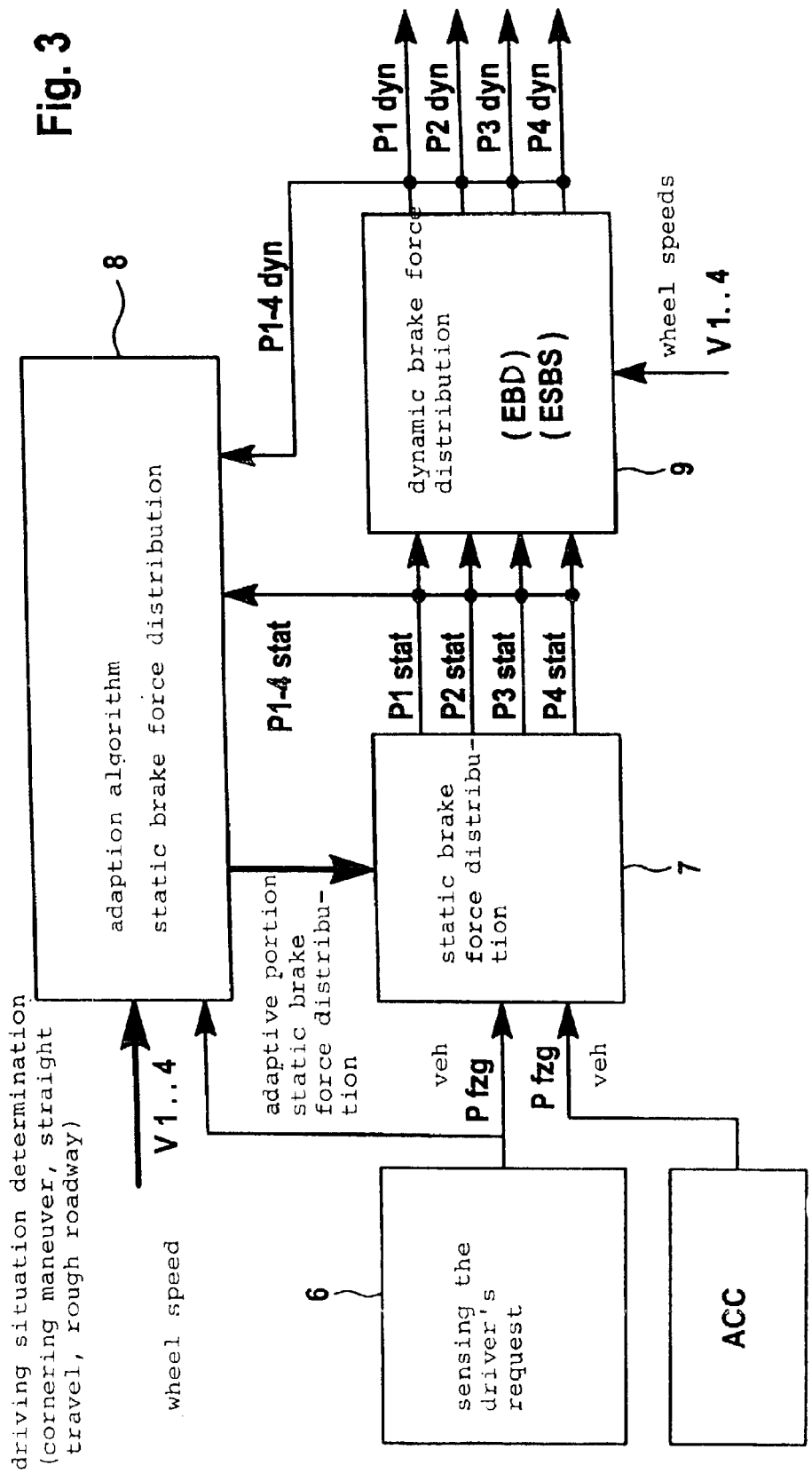
FIG. 3 is another embodiment of a brake system of the present invention.

In FIG. 3 another embodiment of a brake system for implementing the method of the present invention is shown. The 'detection of the driver's request' is represented by block 6 having an output signal which is sent to an electronic brake force distribution 7 that takes the static conditions into account. An arithmetic unit 8 which represents an adaptation algorithm for the adaptive portion of the brake force distribution under static conditions is used for detecting the driving situation (cornering or straight travel, rough roads, etc.), for processing the speeds $V_1$ to $V_4$ of the individual vehicle wheels and for evaluating these input quantities. The output information or signals of the static brake force distribution 7, i.e., the individual components 'P1stat' to 'P4stat' are evaluated in a block 9 in which the dynamic components 'P1dyn' to 'P4dyn' of the brake force distribution are calculated on the basis of the static components 'P1stat' to 'P4stat' and the wheel speeds $V_1$ to 4.

FIG. 3 represents the brake force distribution concept of a brake-by-wire system, especially of an electrohydraulic brake system (EHD) wherein the present invention is implemented.

Figure 4:
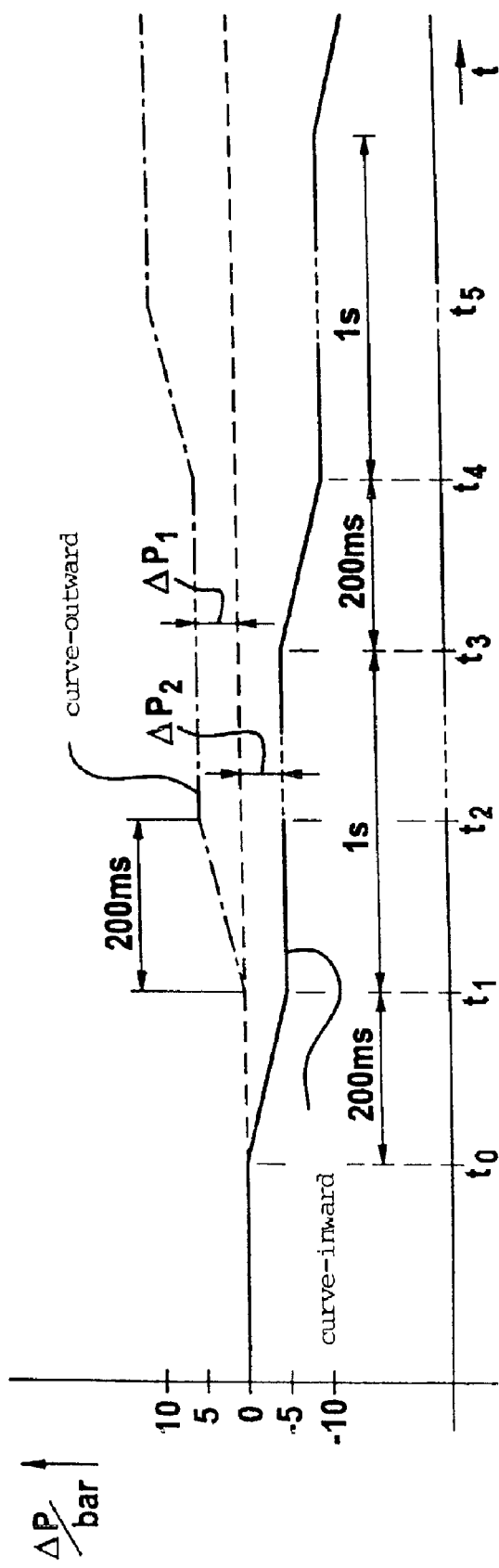
FIG. 4 is a diagram showing the variation of the brake pressure difference at the curve-inward and curve-outward front wheel according to an embodiment of the present invention.

FIG. 4 still shows a diagram for illustrating another embodiment of the present invention which includes that the pressure differential components for considering a cornering maneuver, i.e., the pressure compensation components $\Delta P_1$, $-\Delta P_2$ (see FIG. 1) are added to the wheel brake pressure $P_1$, $P_2$ (see FIG. 1) deferred in time in order to ensure a comfortable generation of the necessary yaw torque for assisting the cornering maneuver. Pressure correction starts at time $t_0$. In the illustrated embodiment, the wheel brake pressure at the curve-inward front wheel is initially lowered by roughly 5 bar (corresponds to $\Delta P_2$ in FIG. 1), and only subsequent thereto, in this case after 200 ms at time $t_1$, will the wheel brake pressure at the curve-outward front wheel be increased by likewise 5 bar ($\Delta P_1$). This is repeated after a pause of 1 second approximately. In practice, these brake force or pressure variations are realized by pulse trains, such as in the embodiment of FIG. 4, or by exactly calculated individual pulses. The duration of the pressure variation pulses can range from 50 ms to some 100 ms.

In other cases, however, a simultaneous brake force or brake pressure increase at the respective front wheels caused by individual pulses or pulse trains is assumed to be sufficient.

What is claimed is:

1. Method for increasing the maneuverability and driving stability of an automotive vehicle equipped with a controlled brake system, comprising the steps of:

(A) monitoring the rotational behavior and the wheel slip of a plurality of individual vehicle wheels during cornering, (B) varying the distribution of the brake force to at least one curve-outward wheel and at least one curve-inward wheel in dependence on the monitoring of step A, (C) during cornering, determining a deceleration of the vehicle which corresponds to the driver's request, (D) decelerating the vehicle in accordance with the deceleration determined in step C by increasing the brake force of said at least one curve-outward wheel in excess of the brake force that corresponds to the driver's request and by decreasing the brake force of said at least one curve-inward wheel, wherein the brake force of said at least one curve-inward wheel is decreased while holding the brake force of said at least one curve-outward wheel constant, followed by increasing the brake force of said at least one of the curve-outward wheel while holding the brake force of said at least one curve-inward wheel constant, and then followed by holding the brake force of both said at least one curve-inward wheel and said at least one curve-outward wheel constant for a predetermined period of time.

2. Method as claimed in claim 1, wherein said controlled brake system is configured as an electro-hydraulic brake system or an electro-mechanic brake system.

3. Method as claimed in claim 1, wherein said controlled brake system includes an electronic brake force distribution control, wherein the static distribution of the brake pressures to a front axle and a rear axle of the automotive vehicle is defined by predetermined characteristic curves.

4. Method as claimed in claim 3, wherein the static characteristic curves of the brake force distribution control are adapted to the load condition of the vehicle and to the condition of the brake system by a superposed algorithm, wherein said adaptation is effected by evaluating the information about rotational speed of the vehicle wheels.

5. Method as claimed in claim 1, wherein at least one of a steering angle sensor, transverse acceleration sensor, longitudinal acceleration sensor and yaw rate sensor, are provided, and wherein an output signal of said at least one sensor is evaluated to improve and secure an input data of the controlled brake system.

6. Method as claimed in claim 1, wherein means for electronic brake force distribution control are provided, said means calculates the distribution of the brake pressures of all wheels, which is optimal in the current driving situation, based on the static specification of the brake pressures and on the behavior of the vehicle during cornering.

7. Method as claimed in claim 6, wherein the brake force distribution control is designed so that the resulting total deceleration of the vehicle corresponds to the driver's request also during a brake function distribution control function.

8. Method as claimed in claim 1, wherein the predetermined period of time is in a range between 50 ms and 500 ms.

9. Method as claimed in claim 8, wherein the predetermined period of time is 200 ms.

\* \* \* \* \*